United States Patent
Chang et al.

(10) Patent No.: US 9,934,387 B2
(45) Date of Patent: Apr. 3, 2018

(54) METHOD AND APPARATUS FOR PROTECTING DIGITAL CONTENT USING DEVICE AUTHENTICATION

(71) Applicant: Samsung Electronics Co., Ltd., Suwon-si, Gyeonggi-do (KR)

(72) Inventors: Moon-Soo Chang, Suwon-si (KR); Seul-Han Park, Yongin-si (KR); Yang-Soo Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/840,494

(22) Filed: Aug. 31, 2015

(65) Prior Publication Data

US 2015/0371051 A1 Dec. 24, 2015

Related U.S. Application Data

(63) Continuation of application No. 13/770,378, filed on Feb. 19, 2013, now Pat. No. 9,122,879.

(30) Foreign Application Priority Data

Feb. 16, 2012 (KR) .................. 10-2012-0016084

(51) Int. Cl.
*G06F 21/10* (2013.01)
*G06F 21/60* (2013.01)
*G06F 21/71* (2013.01)
*G06F 21/57* (2013.01)
(Continued)

(52) U.S. Cl.
CPC .............. *G06F 21/60* (2013.01); *G06F 21/10* (2013.01); *G06F 21/575* (2013.01); *G06F 21/71* (2013.01); *G06F 21/72* (2013.01); *G06F 21/74* (2013.01); *G06F 2221/034* (2013.01);
(Continued)

(58) Field of Classification Search
CPC .......... G06F 21/10; G06F 21/50; G06F 21/57; G06F 21/575; G06F 21/60; G06F 21/71; G06F 21/72; G06F 21/74; G06F 2221/034; G06F 2221/0735; G06F 2221/2105; G06F 2221/2107; G06Q 2220/10;
(Continued)

(56) References Cited

U.S. PATENT DOCUMENTS

| 8,572,400 B2 | 10/2013 | Lin et al. |
| 2008/0098477 A1 | 4/2008 | Williams et al. |
| 2008/0256635 A1 | 10/2008 | Gassoway |

(Continued)

FOREIGN PATENT DOCUMENTS

| CN | 101430745 A | 5/2009 |
| KR | 10-2010-0135505 A | 12/2010 |
| WO | 2008/116346 A1 | 10/2008 |

*Primary Examiner* — Minh Dinh
(74) *Attorney, Agent, or Firm* — Jefferson IP Law, LLP

(57) ABSTRACT

A user device may strengthen the protection level of a digital content by dividing the security and normal modes and performing an operation. In order to further strengthen the protection level of the digital content, the user device may determine whether the main operating system is hacked or not, and blocks the operation in the secure mode. Otherwise, the device authorization information indicating the device security level of the user device is authorized by the content service server, and the user device blocks the operation in the secure mode according to the result.

8 Claims, 7 Drawing Sheets

(51) Int. Cl.
  *G06F 21/72* (2013.01)
  *G06F 21/74* (2013.01)
(52) U.S. Cl.
  CPC ............ *G06F 2221/0735* (2013.01); *G06F 2221/2105* (2013.01); *G06F 2221/2107* (2013.01); *H04L 2463/101* (2013.01)
(58) Field of Classification Search
  CPC ......... G06Q 2220/12; G06Q 2220/145; G06Q 2220/18; H04L 63/101
  See application file for complete search history.

(56) References Cited

U.S. PATENT DOCUMENTS

| | | |
|---|---|---|
| 2009/0119217 A1 | 5/2009 | Ham |
| 2010/0199345 A1 | 8/2010 | Nadir |
| 2010/0268958 A1 | 10/2010 | Home et al. |
| 2011/0035577 A1* | 2/2011 | Lin .................. H04L 63/0428 713/150 |
| 2011/0307703 A1 | 12/2011 | Ogg et al. |
| 2012/0148048 A1 | 6/2012 | Oh et al. |

* cited by examiner

METHOD AND APPARATUS FOR PROTECTING DIGITAL CONTENT USING DEVICE AUTHENTICATION

CROSS-REFERENCE TO RELATED APPLICATION(S)

This application is a continuation application of prior application Ser. No. 13/770,378, filed on Feb. 19, 2013, and claimed the benefit under 35 U.S.C. § 119(a) of a Korean patent application filed on Feb. 16, 2012 in the Korean Intellectual Property Office and assigned Serial number 10-2012-0016084, the entire disclosure of which is hereby incorporated by reference.

BACKGROUND OF THE INVENTION

1. Field of the Invention

The present invention relates to a data processing apparatus. More particularly, the present invention relates to a data processing apparatus that can enhance security by using a secure operating system separate from a main Operating System (OS) and a method thereof.

2. Description of the Related Art

Recently, as digital apparatuses are requested to process high quality service, various digital content has been provided to user devices such as televisions, computers, and portable devices. The digital content may include video files, audio files, various applications, and the like. As the digital content is actively provided, various methods have been proposed for protecting rights on intellectual property of the digital contents.

A Digital Rights Management (DRM) service is one method for protecting digital content. The DRM service continuously manages and protects the intellectual property rights of the digital content using encryption technology. The DRM service is a technology for safely transmitting various content from a Content Provider (CP) to a user and protecting the content from being illegitimately distributed by the user who received the content. The DRM technology allows for the protection of the information during the processes of generating, distributing, using, and discarding digital content, and enables the digital content to be used according to the authorization of the user not only online but also offline while providing rights protection.

In order to use a content to which the DRM technology is applied (DRM content) on a user device, the user device should first connect to a system that provides a corresponding DRM content, and then download the DRM content, meta data on the DRM content, and a license. Meta data refers to data in which information on the DRM content is stored, and the license refers to data indicating an encryption key to be used for decrypting an encrypted DRM content and an authorization for access to the content (for example, the number of times and the period). According to the processes, the DRM content and the license are all stored on the user device, and the DRM content can be consumed.

Meanwhile, the user device employs a Central Process Unit (CPU) and an Operating System (OS). The mobile apparatus employs an open OS for realizing an open application program interface. The open operating system plays a key role in enhancing competitiveness in a mobile apparatus and a mobile service. In addition, the operating system of a mobile apparatus is strategically opened by major manufacturers and major providers, so application program interfaces, software development kits, and also source files are open to public.

As described above, even though the DRM technology is used, the distribution of the digital content still includes some security vulnerabilities. For example, another user device may intercept a license allocated to a specific user device or extract and obtain a license or a decrypted DRM content which is stored on the specific user device by hacking an operating system of the user device.

In addition, the user device downloads a plurality of applications from the Internet, and such applications are to be used after inspecting and guaranteeing the quality of the applications by a manufacturer of a mobile apparatus. In practice, however, not all the functions of various applications are inspected. Accordingly, malicious codes targeting the mobile apparatuses are increasing, and the mobile apparatuses using an open operating system may be attacked by software containing the malicious codes.

Even though the digital content is supported in an encrypted manner, if the user device itself is vulnerable in security, it is limited in preventing illegitimate use and distribution of the digital content.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for protecting a digital content with strengthened security.

Another aspect of the present invention is to provide a method and an apparatus for protecting a digital content by strengthening a device security function of a user device that consumes the digital content.

Another aspect of the present invention is to provide a method and an apparatus for protecting a digital content by strengthening the process of authenticating the security function of a user device.

In accordance with an aspect of the present invention, a method for protecting digital content by a user device including a main operating system and a separate secure operating system executes secure digital content. The method includes requesting an execution of the secure operating system, based on the main operating system detects an input of the execution request relating to the secure digital content; identifying hacking information indicating whether the main operating system is hacked, by the secure operating system; and determining an operation in the secure mode based on the identifying the hacking information, by the secure operating system.

In accordance with another aspect of the present invention, a method for protecting digital content by a user device including a main operating system and a separate secure operating system executes secure digital content. The method includes requesting an execution of the secure operating system based on detecting an input of the execution request relating to the secure digital content; collecting device authentication information indicating a device security level of the device, by the secure operating system; encrypting the device authentication information and transmitting the encrypted device authentication information to the main operating system, by the secure operating system; transmitting the device authentication information to a server that provides the secure content, by the main operating system; receiving an authentication result with respect to a device security level of the device determined based on the device authentication information by the server, by the main operating system; and determining an operation in the secure mode, based on the authentication result, by the secure operating system Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
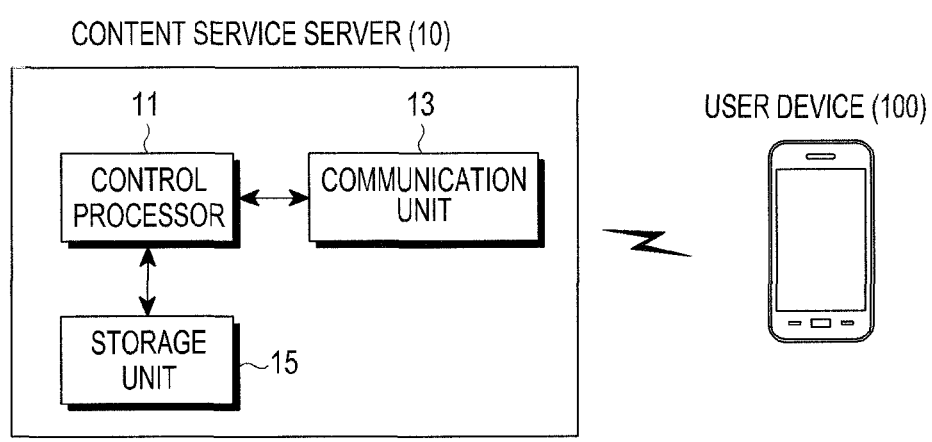
FIG. 1 is a diagram illustrating a configuration of a digital content service system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Recently, digital apparatuses are able to provide a high quality service, so various digital content has been provided to a user device such as a television, a computer, and a portable device. The digital content may include video files, audio files, images, animations, text, and various applications. As digital content has been developed, various methods for protecting rights on intellectual properties of the digital contents have been suggested.

Among them, a Digital Rights Management (DRM) service is a security method in which the content provider provides encrypted digital content with a user device and the user device obtains an encryption key used for decrypting the encrypted digital contents and a license indicating privileges (for example, the number of times, and the period of time) for access to the content so that the corresponding digital contents can be consumed by the user device. The consumption of the digital content is to perform a substantial operation by a user device using digital content, for example, reproduction of video content, reproduction of audio content, and execution of specific applications.

However, in the case of the security methods, by hacking an operating system of the user device, another user device may intercept a license allocated to a specific user device, or extract and obtain a license or a decrypted digital content stored in a specific user device. Even though the digital content is provided in an encrypted manner, if the user device itself has a security vulnerability, the prevention of digital content from unauthorized use or distribution is limited.

Accordingly, exemplary embodiments of the present invention provide a strengthened content protection method by increasing the security level of the execution environment itself inside the user device. In order to secure the stability of an embedded system using a processor, exemplary embodiments of the present invention provide a chip-level security technology subjected to the processor, peripheral devices, and storage devices.

In order to achieve these objects, a user device according to exemplary embodiments of the present invention provides two separated execution environments including a normal execution environment and a security execution environment in a processor. Such abstraction logically separates the performance of normal programs and the performance of important programs directly connected to the security of a device strictly. The user device applies such logical partition not only to a processor but also to peripheral devices and storage devices. The logical partition of the execution environment by the abstraction may play a role in protecting the performance of a program directly connected to security or the resource of the system from the threat of malicious users or programs.

According to exemplary embodiments of the present invention, the user device includes a first Operating System (OS) (hereinafter referred to as a main OS) that supports a normal mode and a second operating system (hereinafter referred to as a secure OS) that supports a secure mode, executes a secure program related to security using a processor in a secure area managed by a secure OS, and executes a normal program in a normal area managed by a main OS. In addition, the access to the secure area through the main OS is blocked. The division between the normal area and the secure area is not a physical division, but a logical division. The normal area indicates the operation of the software and hardware configurations managed in the main OS environment. The secure area indicates the operation of the software and hardware configurations managed in the secure OS environment. Accordingly, some of the hardware configurations may be shared between the normal and secure areas.

For example, if the use of a secure video content that requests security is requested, decryption, decoding, and rendering with respect to the corresponding video file in the secure area under a secure mode is performed for reproduction and output. Data produced in each step is stored in the secure area. In addition, a direct access to the data stored in the secure area through the application in the normal mode or the main OS is not allowed.

In addition, if consumption of normal video content that does not request security is requested, decryption, decoding, and rendering with respect to the corresponding video file in the normal area under a normal mode is performed for reproduction and output. Data produced in each step is stored in the normal area.

Each of the normal video content and the secure video content are reproduced in different operation modes and operation areas. However, the output device that finally outputs the normal video content and the secure video content is shared.

In this manner, according to exemplary embodiments of the present invention, the user device may strengthen the protection level of the digital content by dividing the security and normal modes and properly performing an operation. In addition, in order to further strengthen the protection level of the digital content, the user device may determine whether the main OS is hacked or not, and block the operation in the secure mode. Otherwise, the device authorization information indicating the device security level of the user device is authorized by the content service server, and the user device blocks the operation in the secure mode according to the result.

FIG. 1 is a diagram illustrating a configuration of a digital content service system according to an exemplary embodiment of the present invention.

Referring to FIG. 1, the digital content service system includes a user device 100 and a content service server 10.

The content service server 10 is a device for providing various digital content to user devices enrolled in a digital content service and managing the information on the users enrolled in the service and the information of the corresponding user devices. The content service server 10 may authenticate the device authentication information received from the user device 100, and transmits the result to the user device 100. The device authentication information includes the information capable of evaluating the device security level of the user device 100.

The content service server 10 includes a control processor 11, a communication unit 13, and a storage unit 15.

The control processor 11 controls the overall operations of the content service server 10, and especially controls the operation of the content service server 10 in response to the device authentication request of the user device. The communication unit 13 performs communication with the user device according to the control of the control processor 11.

The storage unit 15 stores various digital content provided by a content provider, information of users enrolled in a service, and information on corresponding user devices. In addition, by using the device authentication information received from the user device, policy information that becomes a standard for evaluating the appropriateness of the device security level of the corresponding user devices is stored.

The user device 100 is a device that consumes digital content by requesting, receiving, and reproducing the digital contents. An example of the user device 100 may be a television, a mobile terminal, a smart phone, a cellular phone, a Personal Multimedia Player (PMP), and an audio file player.

Figure 2:
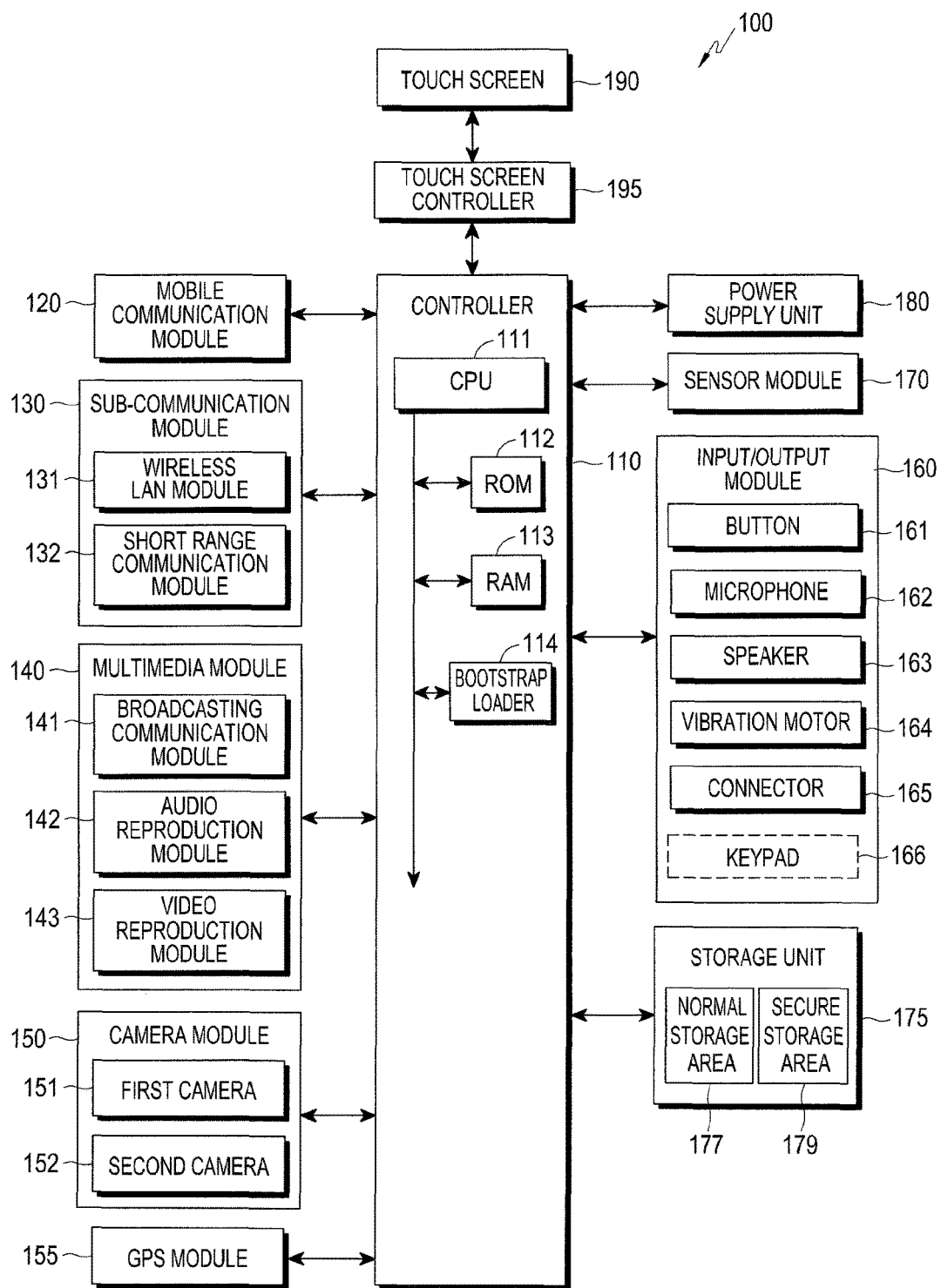
FIG. 2 is a diagram illustrating a configuration of a user device according to an exemplary embodiment of the present invention.

FIG. 2 is a diagram illustrating a configuration of a user device, in which the user device is a mobile apparatus such as a smart phone according to an exemplary embodiment of the present invention.

Referring to FIG. 2, the user device 100 may be connected to an external apparatus (not illustrated) via a mobile communication module 120, a sub-communication module 130, and a connector 165. The "external apparatus" is another apparatus (not illustrated), such as a cellular phone (a smart phone, a tablet Personal Computer (PC), or a server.

The user device 100 includes a touch screen 190 and a touch screen controller 195. In addition, the user device 100 includes a controller 110, a mobile communication module 120, a sub-communication module 130, a multimedia module 140, a camera module 150, a Global Positioning System (GPS) module 155, an input/output module 160, a sensor module 170, a storage unit 175, and a power supply unit 180. The sub-communication module 130 includes at least one of a wireless Local Area Network (LAN) module 131 and a short range communication module 132. The multimedia module 140 includes at least one of a broadcasting communication module 141, an audio reproduction module 142, and a video reproduction module 143. The camera module 150 includes at least one of a first camera 151 and a second camera 152. The input/output module 160 includes a button 161, a microphone 162, a speaker 163, a vibration motor 164, the connector 165, and an optional keypad 166.

The controller 110 includes a Read Only Memory (ROM) 112 that stores a control program for controlling a Central Processing Unit (CPU) 111 and the user device 100, a Random Access Memory (RAM) 113 that stores a signal or data input from outside of the user device 100 or that is used as a storage area for an operation performed in the user device 100, and a bootstrap loader 114 that performs booting when the user device 100 is powered on. The CPU 111 may include a single core processor, a dual core processor, a triple core processor, a quad-core processor, or the like. The CPU 111, the ROM 112, and the RAM 113 may be connected to each other via internal buses.

The controller 110 may control the mobile communication module 120, the sub-communication module 130, the multimedia module 140, the camera module 150, the GPS module 155, the input/output module 160, the sensor module 170, the storage unit 175, the power supply unit 180, a first touch screen 190a, a second touch screen 190b, and the touch screen controller 195.

The controller 110 uses one CPU 111 to maintain multi OS environments corresponding to each of the main OS and the secure OS, and performs an operation in two separate modes of the normal mode and the secure mode respectively corresponding to the main OS and the secure OS, if necessary. The secure mode indicates a mode that performs a security execution that requests security in a secure area, and the normal mode indicates a mode that performs a non-security execution that does not request security in a normal area. According to exemplary embodiments of the present invention, the controller 110 includes a main unit 200 that performs the non-security execution (normal execution) in the main OS environment and a security unit 300 that performs the security execution in the secure OS environment. The controller 110 performs an operation by the main unit 200 and the security unit 300 by separating the normal mode and the secure mode. The main OS is executed in the main unit 200, and the secure OS is executed in a separate manner in the security unit 300. In addition, access by the main OS to the memory area used by the secure OS is blocked. Accordingly, even when the main OS is an open OS, malicious code may not access to the secure OS and the memory area used by the secure OS.

Figure 3:
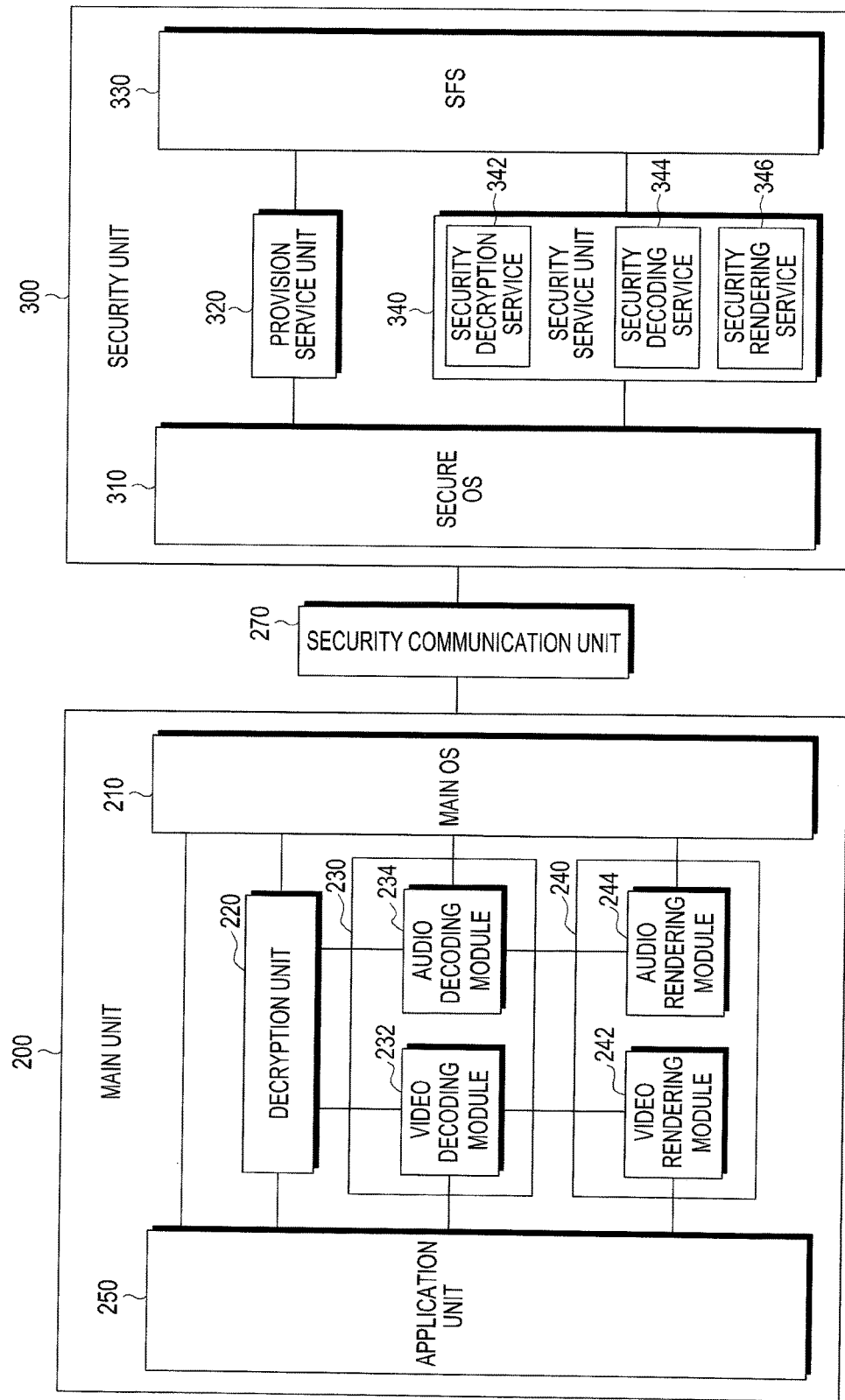
FIG. 3 is a diagram illustrating a configuration of a controller according to an exemplary embodiment of the present invention.

Accordingly, the main unit 200 and the security unit 300 include a plurality of function modules that are requested for performing the normal execution and the security execution, respectively. Examples of the configurations of the main unit 200 and the security unit 300 are illustrated in FIG. 3.

The controller 110 executes a normal program, a normal application, or digital content that does not request security in a normal mode, and executes a program that requests security, an application that requests security, or secure content that requests security in a secure mode. According to an exemplary embodiment of the present invention, the digital content that requests security, (i.e., the secure content) may be content that is protected by a content protection system, such as DRM. In addition, all the content that request security may be divided into content that request high security and content that request relatively-low security. Content that requests high security is processed by the security unit 300, and content that requests relatively-low security is processed in the main unit 200. For example, the controller 110 may decrypt, decode, and render audio and/or video streams corresponding to secure contents in the secure mode.

Specifically, when a request for executing a specific digital content according to the user request is received, the controller 110 confirms whether the specific digital content is a secure content or a normal content. If the specific digital content is a secure content, the controller 110 switches to a secure mode and processes a specific content in the secure area. For example, if the specific digital content is a video content to which DRM is applied, the controller 110 decrypts, decodes, renders audio and/or video stream of the video content in the secure mode, and stores the process result in the secure storage area to which access is limited. In addition, the controller 110 controls so that the audio and/or video data stored in the secure storage area in the secure mode is output through the multimedia module 140. In this manner, the controller 110 controls so that secure content is processed using a secure storage area 179 to which access is limited in the secure mode, so it is difficult to hack the secure content.

In the controller 110, the main unit 200 and the security unit 300 are included in the CPU 111. The configuration of the CPU 111 is illustrated in FIG. 3.

FIG. 3 is a diagram illustrating a configuration of a controller according to an exemplary embodiment of the present invention.

Referring to FIG. 3, the CPU 111 includes the main unit 200 that performs normal execution, the security unit 300 that performs security execution, and a security communication unit 270 that performs a communication between the main unit 200 and the security unit 300. The main unit 200 uses a main OS, and performs, in a normal mode, execution of a normal program, a normal application, or a normal content which does not request security. If execution of a secure program, a secure application, or a secure content which requests security is needed, the execution is instructed or requested to the security unit 300 through the security communication unit 270.

A main OS 210 is executed in the main unit 200, and a secure OS 310 is executed in a separate manner in the security unit 300. In addition, the main OS 210 may not directly access the security unit 300, and may instruct or request the execution of a specific function, thread, and process through the security communication unit 270. The security communication unit 270 enables a data processing apparatus or a mobile apparatus to perform switching between a secure mode and a non-secure mode. The security communication unit 270 may partition a memory area to which the main unit 200 may access and a memory area to which the security unit 300 may access, on a hardware using a predetermined bit. Accordingly, access by the main unit 200 to the memory area used by the security unit 300 is blocked. Accordingly, if the main OS 210 of the main unit 200 is an open OS, malicious code may not access to the secure OS 310 and a memory area used by the secure OS 310. A method of processing a content that requests security in the security unit 300 is described below.

The security unit 300 executes a secure program, a secure application, or a secure content which requests security under a secure mode according to a request of the main unit 200.

The main unit 200 includes a main OS 210, a decryption unit 220, a decoding unit 230, a rendering unit 240, and an application unit 250. The security unit 300 includes a secure OS 310, a security service unit 340, a provision service unit 320, and a Secure File System (SFS) 330.

The main OS 210 is a main operating system of the user device 100. The main OS 210 performs an overall operation of the user device 100 in the normal mode, and especially performs an execution of a normal program, a normal application, or a normal content that does not request security, in a normal mode. When execution of a secure program, a secure application, and a secure content that requests security is needed, the main OS 210 instructs or requests the corresponding execution to the security unit 300 through the security communication unit 270.

When execution of content is requested, the decryption unit 220 reads an audio and/or video stream corresponding to the execution requested content from a normal storage area 177, and determines whether the audio and/or video stream is an audio and/or video stream that requests security. The decryption unit 220 may confirm whether a content protection system such as DRM is applied to the audio and/or video stream, and may determine whether the audio and/or video stream requests security. In addition, when an identifier that enables the audio and/or video stream is to be executed in the secure mode is included in the audio and/or video stream, the decryption unit 220 may determine whether the audio and/or video stream requests security.

If the content requested to be executed is an audio and/or video stream that does not request security, the decryption unit 220 stores the audio and/or video streams that do not request security in the normal storage area 177 in a manner of dividing into a payload unit, and requests decoding. If the execution requested audio and/or video streams are audio and/or video streams that request security, the decryption unit 220 divides the security requested audio and/or video streams into a payload unit, and requests the main OS 210 to perform security decryption with respect to the security requested audio and/or video stream in a payload unit. In addition, if information indicating that the security decryption is completed is received from the main OS 210, the decryption unit 220 requests the decoding unit 230 to perform decoding.

The decoding unit 230 includes a video decoding module 232 and an audio decoding module 234. If it is requested to decode normal audio and/or video streams that do not request security, the decoding unit 230 decodes audio and/or video streams in a payload unit stored in the normal storage area 177 into audio and/or video data in a frame unit using the audio and/or video codec through the video decoding module 232 and/or the audio decoding module 234 in the normal mode. The decoding unit 230 stores the decoded audio and/or video data in the normal storage area 177, and requests the rendering unit 240 to perform rendering. When it is requested to decode a video stream that requests security, the decoding unit 230 requests the main OS 210 to perform security decoding in a secure mode. In addition, if information indicating that the security decoding is completed is received from the main OS 210, the decoding unit 230 requests the rendering unit 240 to perform rendering.

The rendering unit 240 includes a video rendering module 242 and an audio rendering module 244. If it is requested to render normal audio and/or video data that does not request security, the rendering unit 240 performs video rendering by the video rendering module 242 and/or the audio rendering module 244 in a normal mode, so that decoded video data stored in the normal storage area 177 is generated into 2-dimensional and 3-dimensional video signals that can be displayed on a screen, and outputs the generated video signals. The rendering unit 240 renders the decoded audio data into an analog audio signal.

Meanwhile, when it is requested to render video data that requests security, the rendering unit 240 requests the main OS 210 to perform security rendering in a secure mode. In addition, when information indicating that security rendering is completed from the main OS 210, the rendering unit 240 requests output of the rendered video signal and audio signal. The rendered video signal and audio signal are output through a display device and a speaker, respectively.

The application unit 250 includes a content download application, a content reproduction application, or the like, and performs a corresponding function when the application is executed according to a user request.

The secure OS 310 is a secure operating system of the user device 100. The secure OS 310 executes secure content that requests security in the secure mode. If at least one of a decryption request, a decoding request, and a rendering request with respect to a video stream that requests security or a decryption request with respect to an audio stream that requests security is received from the main OS 210 through the security communication unit 270, the secure OS 310 transmits the received request to the security service unit 340.

The provision service unit 320 receives a security key and authentication information from external content protection service providers (such as DRM service providers) and stores the security key and authentication information in the SFS 330. In addition, the security key and the authentication information may be stored in the SFS 330 in advance by an apparatus manufacturer.

The SFS 330 is a storage area that is accessible in a secure mode, and includes various programs and information for executing a secure content that requests security, such as a decryption execution, a decoding execution, and a rendering execution with respect to an audio and/or video signal that requests security. In addition, the SFS 330 stores a security key and authentication information stored by the provision service unit 320.

The security service unit 340 includes a security decryption service 342 that performs a security decryption, a security decoding service 344 that performs security decoding, and a security rendering service 346 that performs security rendering. The security service unit 340 performs security decryption through the security decryption service 342. The security service unit 340 performs security decoding through the security decoding service 344. The security service unit 340 performs security rendering through the security rendering service 346.

If a decryption request with respect to a video stream that requests security is transmitted from the secure OS 310, the security service unit 340 performs security decryption with respect to a video stream that requests security using a security key and authentication information stored in the SFS 330, and stores, in the secure storage area 179, the video stream on which security decryption is performed. In addition, if a decoding request with respect to a video stream that requests security is transmitted from the secure OS 310, the security service unit 340 performs security decoding with respect to a video stream that requests security using a corresponding video codec, and stores a security decoded video stream in the secure storage area 179. In addition, if a rendering request with respect to video data that requests security is transmitted from the secure OS 310, the security service unit 340 performs security rendering so that the decoded video data is generated into a video signal to be displayed on a 2-dimensional or 3-dimensional screen, and outputs the video signal to the main unit 200.

In response to a decryption request with respect to a video stream that requests security from the secure OS 310, the security service unit 340 performs security decryption with respect to an audio stream that requests security using a security key and authentication information stored in the SFS 330, and the security service unit 340 stores the security decrypted audio stream in the secure storage area 179.

Referring back to FIG. 2, when the user device 100 is powered on, the bootstrap loader 114 boots the user device 100. When the booting is started, the bootstrap loader 114 loads the secure OS first, and loads the main OS when the secure OS is completely loaded.

Further, according to an exemplary embodiment of the present invention, the bootstrap loader 114 confirms whether the main OS is hacked in a booting process. For example, hacking of main OS can be a rooting of main OS (ex, Android OS rooting). Android rooting is the process of allowing users of smart phones, tablets, and other devices running the Android mobile operating system to attain privileged control (known as "root access") within Android's subsystem. Rooting is often performed with the goal of overcoming limitations that carriers and hardware manufacturers put on some devices, resulting in the ability to alter or replace system applications and settings, run specialized apps that require administrator-level permissions, or perform other operations that are otherwise inaccessible to a normal Android user. On Android, rooting can also facilitate the complete removal and replacement of the device's operating system, usually with a more recent release of its current operating system.

For example, the bootstrap loader 114 refers to a ROM binary image of the main OS legitimately equipped on the user device 100 to confirm whether the ROM binary image is similar to the main OS of the user device 100 or not. If it is determined that the ROM binary image is not similar, it is decided that the main OS has been changed by a user. Otherwise, if a signature of a distributor who distributes the main OS or the like is confirmed, and a proper signature is not present on the ROM binary image with respect to the main OS of the user device 100 at the booting point, it is decided that the main OS has been changed by a user. The ROM binary image of the legitimately equipped main OS is stored in the normal storage area 177.

If it is determined that the main OS is hacked, the bootstrap loader 114 stores the hacking information of the main OS on the secure storage area 179. The bootstrap loader 114 may store hacking information of the main OS on the secure storage area 179 under the secure mode through the security unit 300.

When execution of a secure content is requested or security execution is requested afterwards, the hacking information of the main OS may be used as a standard for deciding whether or not the controller 110 is operated in a secure mode.

The bootstrap loader 114 confirms integrity of each of the function modules of the security unit 300 in a booting process. The bootstrap loader 114 loads the secure OS and confirms a binary image of each of the function modules of the security unit 300 at the time of booting, and confirms a signature of a distributor of each of the function modules. If a proper signature of a distributor does not exist on a binary image of each of the function modules at the time of booting, it is decided that the integrity of each of the function modules is damaged. Each of the function modules of the security unit 300 may be, for example, the provision service unit 320, the security service unit 340, and the SFS 330. The normal binary image of each of the function modules of the security unit 300 is stored on the normal storage area 177, and the normal binary image of each of the function modules of the security unit 300 at the time of booting may be provided from the security unit 300 according to a request of the bootstrap loader 114.

The bootstrap loader 114 stores the result obtained by confirming integrity of each of the function modules of the security unit 300 on the secure storage area 179 under the secure mode through the security unit 300. The result obtained by confirming integrity of each of the function modules of the security unit 300 may be also used as a standard for deciding whether or not the controller 110 is operated in a secure mode, when execution of a secure content is requested or security execution is requested.

The storage unit 175 may store a signal or data that is input/output corresponding to an operation of the mobile communication module 120, the sub-communication module 130, the multimedia module 140, the camera module 150, the GPS module 155, the input/output module 160, the sensor module 170, or the touch screen 190, according to the control of the controller 110. The storage unit 175 may store control programs and applications for controlling the user device 100 or the controller 110.

The term "storage unit" includes the storage unit 175, the ROM 112 in the controller 110, the RAM 113, or a memory card (not illustrated) mounted on the user device 100 (for example, an SD card and a memory stick). The storage unit may include a non-volatile memory, a volatile memory, a Hard Disk Drive (HDD), or a Solid-State Drive (SSD).

The storage unit 175 may include the normal storage area 177 and the secure storage area 179. The normal storage area 177 may store normal data and programs, and the secure storage area 179 may store data and programs to which only components allowed to access can access in the secure mode. According to an exemplary embodiment of the present invention, the normal storage area 177 may store an audio and/or video stream corresponding to content downloaded using at least one of the mobile communication module 120, the wireless LAN module 131, and the short range communication module 132. In addition, the normal storage area 177 may store decrypted audio and/or video data, decoded audio data and/or video data, and the like that is generated at the time of performing decryption and decoding with respect to the normal content in the normal mode. The secure storage area 179 may store the decrypted audio and/or video data, decoded audio and/or video data, and the like that are generated at the time of decryption or decoding with respect to a secure content in a secure mode. The term "storage unit" may include the storage unit 175, the ROM 112 in the controller 110, the RAM 113, and a memory card (not illustrated) mounted on the user device 100 (for example, an SD card and a memory stick). The storage unit may include a non-volatile memory, a volatile memory, a hard disk drive (HDD), or a solid-state drive (SSD).

The mobile communication module 120 enables the user device 100 to be connected to an external device by a mobile communication using at least one (one or more) antennas (not illustrated) according to the control of the controller 110. The mobile communication module 120 transmits/receives wireless signals for a voice communication, a video communication, a Short Message Service (SMS), and a Multimedia Messaging Service (MMS) with a cellular phone (not illustrated), a smart phone (not illustrated), a tablet PC, or other devices (not illustrated) which have telephone numbers input to the user device 100.

The sub-communication module 130 may include at least one of the wireless LAN module 131 and the short range communication module 132. For example, the sub-communication module 130 may include the wireless LAN module 131 only, the short range communication module 132 only, or both of the wireless LAN module 131 and the short range communication module 132.

The wireless LAN module 131 may be connected to the Internet according to the control of the controller 110 at a place where a wireless Access Point (AP) (not illustrated) is installed. The wireless LAN module 131 supports a wireless LAN standard of the Institute of Electrical and Electronics Engineers (IEEE) (IEEE 802.11x). The short range communication module 132 may wirelessly perform a short range communication between the user device 100 and an image forming apparatus (not illustrated) according to the control of the controller 110. The short range communication may include Bluetooth, Infrared Data Association (IrDA), and the like.

The user device 100 may include at least one of the mobile communication module 120, the wireless LAN module 131, and the short range communication module 132. For example, the user device 100 may include a combination of the mobile communication module 120, the wireless LAN module 131, and the short range communication module 132.

At least one of the mobile communication module 120, the wireless LAN module 131, and the short range communication module 132 transmits a request signal for requesting secure content from an external content provider under the control of the controller 110, or may receive secure content in response to a secure content request. In addition, at least one of the mobile communication module 120, the wireless LAN module 131, and the short range communication module 132 may request or receive key data and authentication information for decrypting or authenticating a protected content such as DRM under the control of the controller 110.

The multimedia module 140 may include the broadcasting communication module 141, the audio reproduction module 142, or the video reproduction module 143. The broadcasting communication module 141 may receive a broadcasting signal (for example, a TeleVision (TV) broadcasting signal, a radio broadcasting signal, or a data broadcasting signal) and a broadcasting addition information (for example, Electric Program Guide (EPS) or Electric Service Guide (ESG)) transmitted from a broadcasting station through the broadcasting antenna (not illustrated) according to the control of the controller 110. The audio reproduction module 142 may reproduce a digital audio file (for example, a file having a filename extension of mp3, wma, ogg, or way) stored or received according to the control of the controller 110. The video reproduction module 143 may reproduce a digital video file (for example, a file having a filename extension of mpeg, mpg, mp4, avi, mov, or mkv) stored or received according to the control of the controller 110. The video reproduction module 143 may reproduce a digital audio file.

The multimedia module 140 may include the audio reproduction module 142 and the video reproduction module 143 excluding the broadcasting communication module 141. In addition, the audio reproduction module 142 or the video reproduction module 143 of the multimedia module 140 may be included in the controller 110. The multimedia module 140 processes and outputs audio and/or video data stored in the normal storage area 177 in the normal mode under the control of the controller 110, and processes and outputs audio and/or video data stored in the secure storage area 179 in the secure mode.

The camera module 150 may include at least one of the first camera 151 and the second camera 152 that captures a still image or a moving image according to the control of the controller 110. In addition, the first camera 151 or the second camera 152 may include an auxiliary light source (for example, a flash (not illustrated)) that provides a light amount required for capturing an image. The first camera 151 is mounted on the front surface of the user device 100, and the second camera 152 is mounted on the rear surface of the user device 100. According to another method, the first camera 151 and the second camera 152 are arranged adjacently (for example, the space between the first camera 151 and the second camera 152 is larger than 1 cm and smaller than 8 cm) and may capture a 3-dimensional still image and a 3-dimensional moving image.

The GPS module 155 may receive a radio signal from a plurality of GPS satellites (not illustrated) in the earth's orbit, and may calculate a location of the user device 100 using the time of arrival from the GPS satellite (not illustrated) to the user device 100.

The input/output module 160 may include at least one of the plurality of buttons 161, the microphone 162, the speaker 163, the vibration motor 164, the connector 165, and the optional keypad 166.

The button 161 may be formed on the front surface, the side surface, or the rear surface of the housing of the user device 100, and include at least one of a power/lock button (not illustrated), a volume button (not illustrated), a menu button, a home button, a back button and a search button.

The microphone 162 generates an electric signal by receiving an input of a voice or a sound according to the control of the controller 110.

The speaker 163 may output, to the outside of the user device 100, a sound corresponding to various signals (for example, a wireless signal, a broadcasting signal, a digital audio file, a digital video file, a picture photograph, or the like) of the mobile communication module 120, the sub-communication module 130, the multimedia module 140, or the camera module 150 according to the control of the controller 110. The speaker 163 may output a sound (for example, a button operation sound or a communication connection sound corresponding to a telephone communication) corresponding to a function that is performed by the user device 100. One or more speakers 163 may be formed at a proper position or positions of the housing of the user device 100.

The vibration motor 164 may convert an electric signal into a mechanical vibration according to the control of the controller 110. For example, when a voice communication is received from another apparatus (not illustrated), the user device 100 in a vibration mode operates the vibration motor 164. One or more vibration motors 164 may be formed in the housing of the user device 100. The vibration motor 164 may perform an operation in response to a touch operation of a user who touches on the touch screen 190 and a continuous movement of a touch on the touch screen 190.

The connector 165 may be used as an interface for connecting the user device 100 with an external apparatus (not illustrated) or a power supply (not illustrated). According to the control of the controller 110, data stored in the storage unit 175 of the user device 100 through a wire cable connected to the connector 165 may be transmitted to an external apparatus (not illustrated) or the data may be received from an external apparatus (not illustrated). An electric power is input or a battery (not illustrated) is charged from a power supply (not illustrated) through a wire cable connected to the connector 165.

The keypad 166 may receive key input from a user for controlling the user device 100. The keypad 166 includes a physical keypad (not illustrated) formed in the user device 100 or a virtual keypad (not illustrated) displayed on the touch screen 190. The physical keypad (not illustrated) formed on the user device 100 may be excluded according to the design or the structure of the user device 100.

The sensor module 170 may include at least one sensor that detects a state of the user device 100. For example, the sensor module 170 may include a proximity sensor that detects whether a user approaches the user device 100, an illuminance sensor (not illustrated) that detects the amount of light near the user device 100, and a motion sensor (not illustrated) that detects an operation (for example, a rotation of the user device 100, acceleration or vibration applied to the user device 100) of the user device 100. At least one sensor detects a state, generates a signal corresponding to the detection, and transmits the generated signal to the controller 110. The sensors of the sensor module 170 may be added or removed according to the performance of the user device 100.

The storage unit 175 may store a signal or data that is input/output corresponding to the operation of the mobile communication module 120, the sub-communication module 130, the multimedia module 140, the camera module 150, the GPS module 155, the input/output module 160, the sensor module 170, and the touch screen 190 according to the control of the controller 110. The storage unit 175 may store control programs and applications for controlling the user device 100 or the controller 110.

The power supply unit 180 may supply power to one or more batteries (not illustrated) disposed in the housing of the user device 100 according to the control of the controller 110. One or more batteries (not illustrated) supply power to the user device 100. In addition, the power supply unit 180 may supply power input from an external power supply (not illustrated) to the user device 100 through a wire cable connected to the connector 165.

The touch screen 190 may provide user interfaces (for example, a communication, data transmission, broadcasting, and photographing) corresponding to various services with a user. According to an exemplary embodiment of the present invention, a user interface for performing applications such as a content download application or a content reproduction application may be provided.

The touch screen 190 may transmit, to the touch screen controller 195, and an analog signal corresponding to at least one touch received as an input to the user interface. The touch screen 190 may receive an input of at least one touch through a body of the user (for example, a finger including a thumb) or touchable input means (for example, a stylus pen). In addition, the touch screen 190 may input a continuous movement of one touch among at least one touch. The touch screen 190 may transmit an analog signal corresponding to a continuous movement of an input touch to the touch screen controller 195. For example, a request for executing content download application by a user, or an analog signal corresponding to various user selections generated during execution of the content download application, may be transmitted to the touch screen controller 195.

A touch according to exemplary embodiments of the present invention is not limited to a contact of the touch screen 190 with the body of the user or the touchable input means, and the touch may include non-contact (for example, a distance between the touch screen 190 and the body of the user or the touchable input means is 1 mm or less). The detectable distance by the touch screen 190 may be changed according to the performance or the structure of the user device 100.

The touch screen 190 may be implemented by a resistive type, a capacitive type, an infrared type, and an acoustic wave type.

The touch screen controller 195 converts an analog signal received from the touch screen 190 into a digital signal (for example, X and Y coordinates) and transmits the digital signal to the controller 110. The controller 110 may control the touch screen 190 using the digital signal received from the touch screen controller 195. For example, the controller 110 may enable a shortcut icon (not illustrated) displayed on the touch screen 190 to be selected in response to the touch or may execute a shortcut icon (not illustrated). In addition, the touch screen controller 195 may be included in the controller 110.

Figure 4:
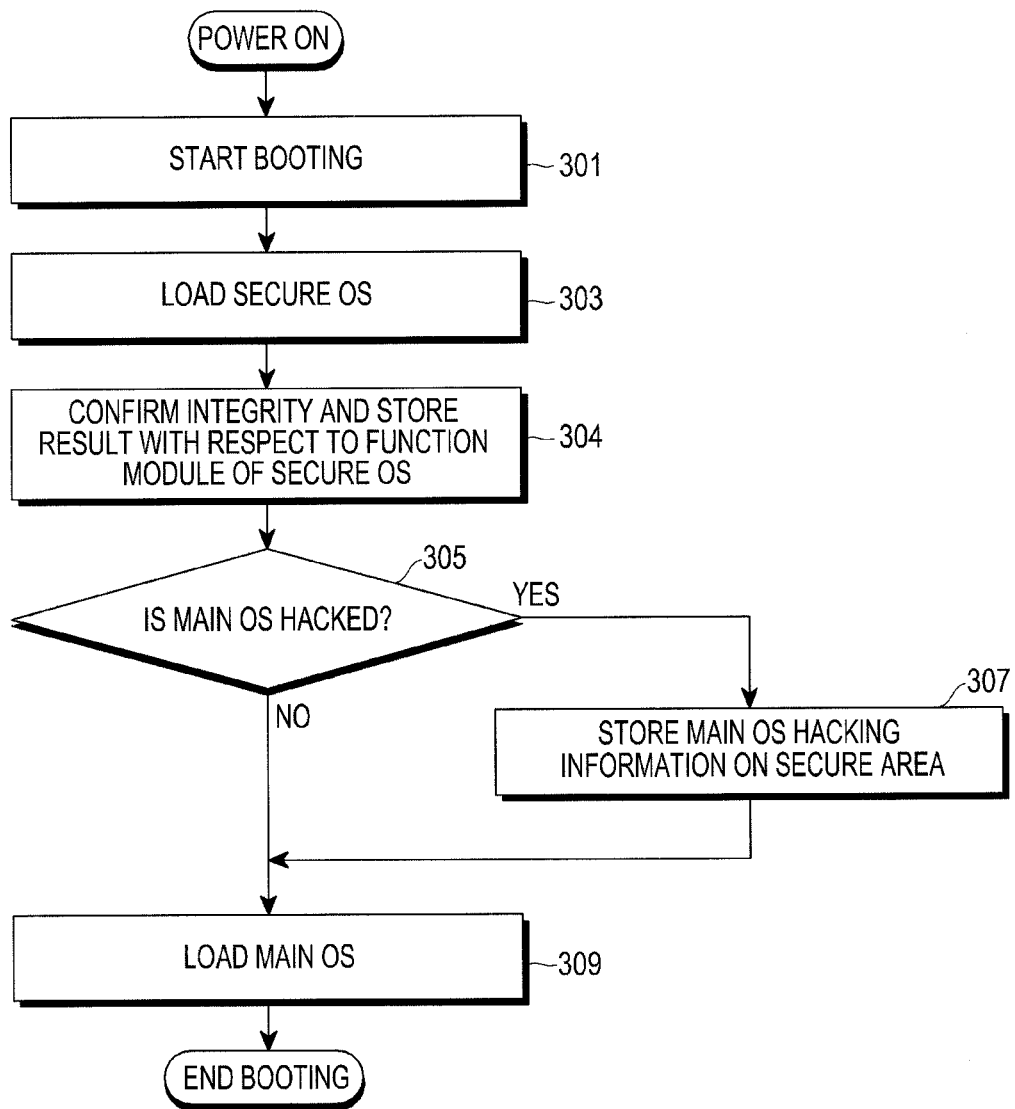
FIG. 4 is a diagram illustrating a booting process of a user device according to an exemplary embodiment of the present invention.
Figure 5:
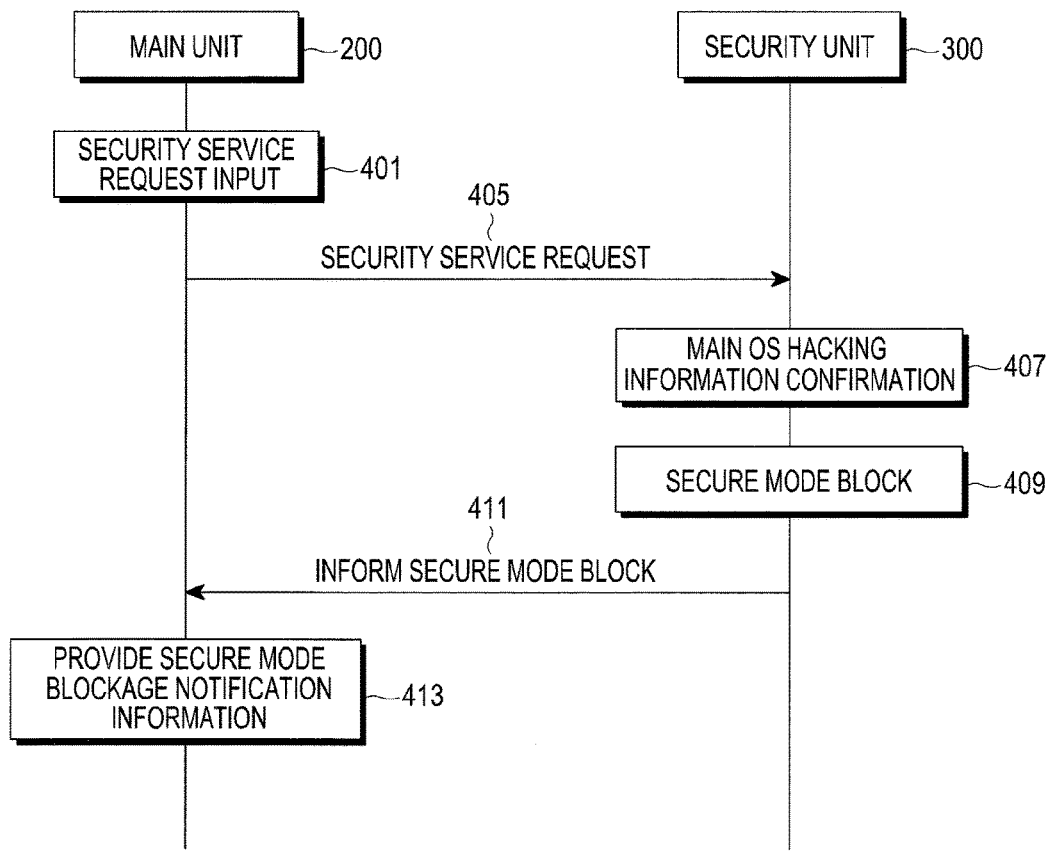
FIGS. 5 and 6 are diagrams illustrating security authentication processes of user devices according to exemplary embodiments of the present invention.
Figure 6:
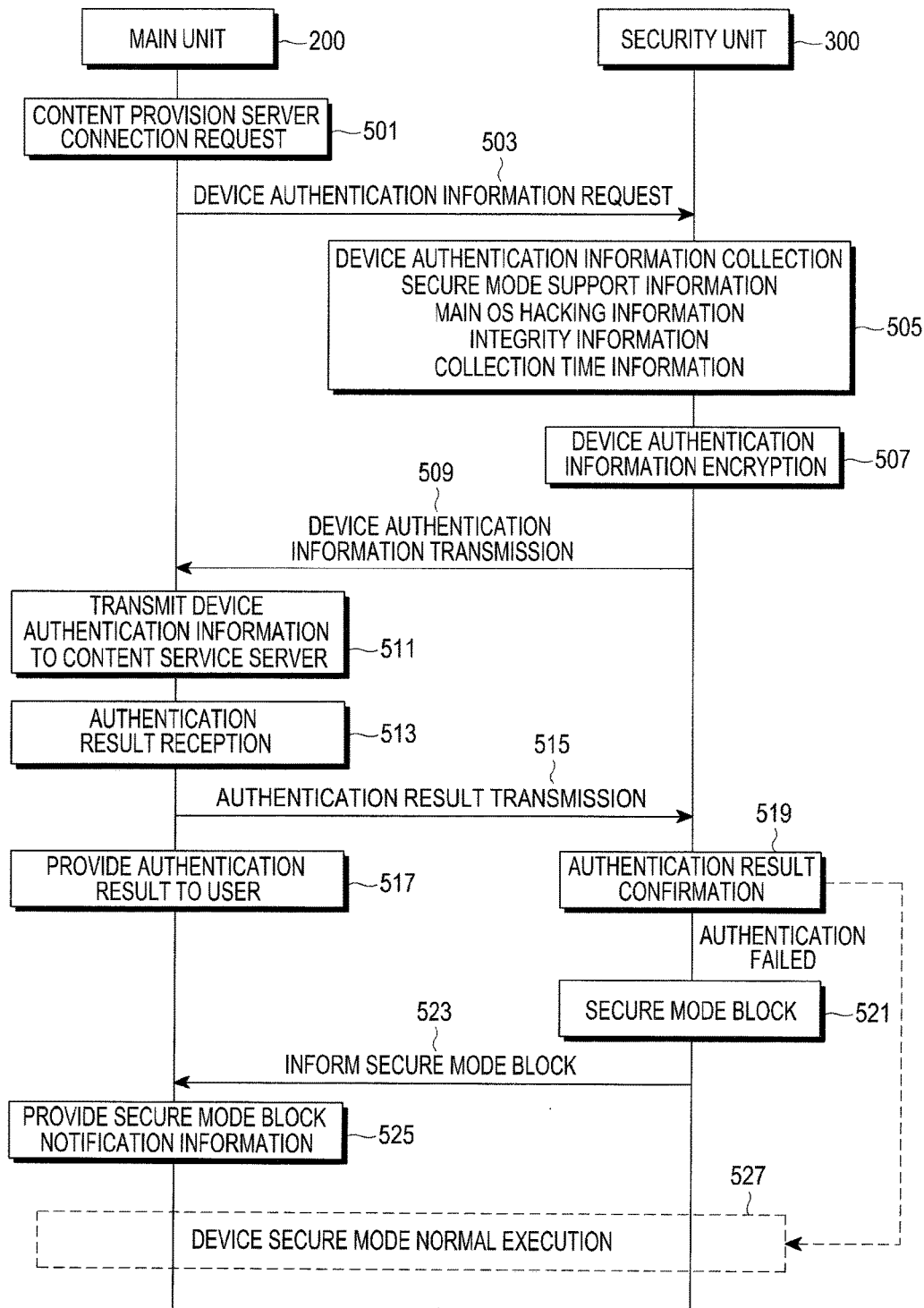
Figure 7:
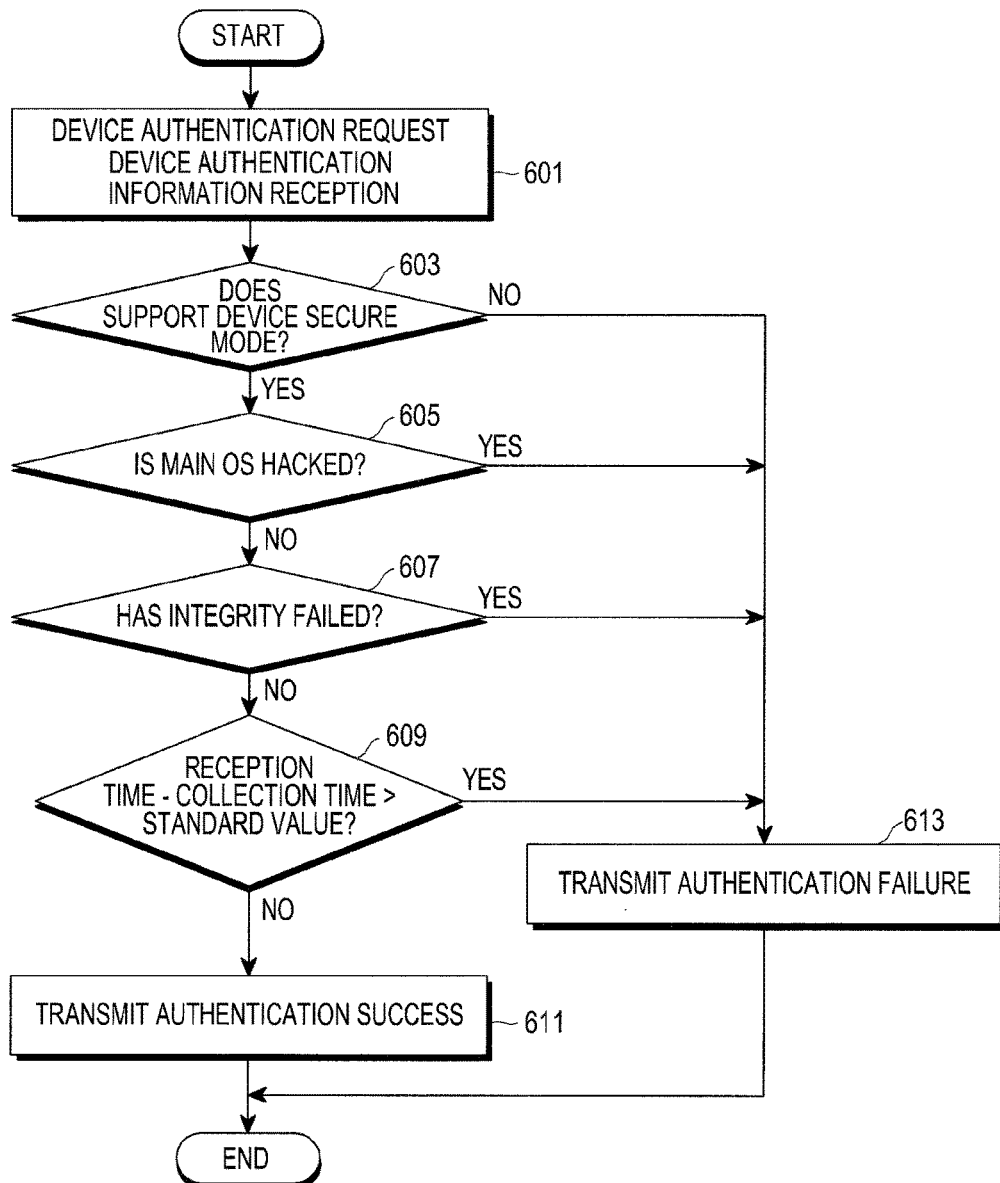
FIG. 7 is a diagram illustrating an operation process of a digital content service server according to an exemplary embodiment of the present invention.

A process in the user device 100 configured as described above for confirming a device security level of the user device 100, blocking the operation of the secure mode itself according to the result, and strengthening the protection level with respect to the digital content is described below with reference to FIGS. 4 to 7. FIGS. 4 and 5 are diagrams illustrating examples according to the present invention that the user device 100 determines whether the main OS is hacked or not and blocks performing an operation of the user device in a secure mode. FIGS. 6 and 7 are diagrams illustrating an example according to the present invention that the content service server 10 authenticates device authentication information indicating the device security level of the user device 100, and the user device 100 blocks performing an operation of the user device 100 in the secure mode.

FIG. 4 is a diagram illustrating a booting process of a user device according to an exemplary embodiment of the present invention.

Referring to FIG. 4, when the user device 100 is powered on, the bootstrap loader 114 starts booting in step 301. The bootstrap loader 114 loads a secure OS in step 303, and confirms integrity with respect to each of the function modules of the security unit 300 in step 304. The bootstrap loader 114 requests the security unit 300 to store the integrity confirmation result of each of the function modules. The security unit 300 stores the integrity confirmation result on the secure storage area 179 under the secure mode according to the request.

The bootstrap loader 114 confirms whether the main OS is hacked in step 305. According to the confirmation result, if it is confirmed that the main OS is hacked, the bootstrap loader 114 requests the security unit 300 to store the hacking information of the main OS in step 307. The security unit 300 stores the hacking information of the main OS in the secure storage area 179 under the secure mode according to the request.

The bootstrap loader 114 loads the main OS in Step 309 and ends booting.

FIGS. 5 and 6 are diagrams illustrating security authentication processes of user devices according to exemplary embodiments of the present invention.

Referring to FIG. 5, the main unit 200 receives an input of an execution request of a security service in step 401. The execution request of the security service is a request with respect to various services that request security, for example, a request for obtaining secure contents from outside and an execution request with respect to the secure contents. Wherein the main unit 200 includes the main OS and the security unit 300 includes the secure OS.

When a security service request is input, the main unit 200 informs the security unit 300 that the security service request is input in step 405. Accordingly, the security unit 300 confirms whether the hacking information of the main OS exists in the secure storage area 179 in step 407. If the hacking information of the main OS does not exist, the security unit 300 executes the requested security service in a secure mode. However, if the hacking information of the main OS exists, the security unit 300 proceeds to step 409 and blocks the secure mode. In addition, the security unit 300 informs the main unit 200 that the secure mode is blocked in step 411.

Accordingly, the main unit 200 provides the user with an information message informing that the secure mode is blocked and the security service request may not be performed in step 413.

In other words, the main OS confirms whether the main OS is hacked, and if it is confirmed that the main OS is hacked, the secure OS blocks the secure mode.

Accordingly, the user device 100 confirms whether the main OS is hacked, and if it is confirmed that the main OS is hacked, the user device 100 determines that the device security level of the user device 100 does not satisfy the standard value and blocks the operation itself of the secure mode so that the security level with respect to the secure content can be strengthened.

According to another exemplary embodiment of the present invention, the device security level of the user device 100 is authenticated from the digital content service server 10 and the operation in the secure mode may be blocked according to the result. Such process is illustrated in FIG. 6.

Referring to FIG. 6, if access to the digital content service server 10 is requested in step 501, the main unit 200, i.e. the main OS, requests device authentication information from the security unit 300, i.e. the secure OS, in step 503. The connection to the digital content service server 10 may be generated at the time of requesting download with respect to the digital content. The device authentication information is information on various causes that can determine the device security level of the user device 100, for example, the hacking information of the main OS, and/or information on the integrity confirmation results on each of the function modules of the security unit 300.

The security unit 300 proceeds to step 505 according to the request in step 503, and collects device authentication information in the secure mode. For example, the security unit 300 collects the security information that indicates whether the secure mode is supported, the hacking information of the main OS that indicates whether the main OS is hacked, and the integrity information that indicates integrity confirmation results of each of the function modules of the security unit 300. In addition, collection time information that indicates the time when the device authentication information is collected is included in the device authentication information.

The security unit 300 encrypts device authentication information in step 507, and transmits the encrypted device authentication information to the main unit 200 in step 509.

When the device authentication information is transmitted, the main unit 200 transmits the device authentication information together with a device authentication request to the digital content service server 10 in step 511.

If the digital content service server 10 receives the device authentication request and the device authentication information, the digital content service server 10 performs an operation as illustrated in FIG. 7.

FIG. 7 is a diagram illustrating an operation process of a digital content service server according to an exemplary embodiment of the present invention.

Referring to FIG. 7, if the digital content service server 10 in step 601 receives a device authentication request and device authentication information, the received device authentication information is decrypted and the device authentication information is confirmed through steps 603 to 609. The digital content service server 10 in step 603 confirms the security information to confirm whether the user device 100 supports the secure mode. If it is determined that the user device 100 dose not support the secure mode, the digital content service server 10 proceeds to step 613, informs the user device 100 that the authentication has failed, and ends the authentication process.

If the user device 100 supports the secure mode, the content service server 10 proceeds to step 605, confirms the hacking information of the main OS, and confirms whether the main OS of the user device 100 is hacked. According to the confirmation result, if it is determined that the main OS is hacked, the content service server 10 proceeds to step 613, informs the user device 100 that the authentication has failed, and ends the authentication process.

If it is confirmed that the main OS of the user device 100 is not hacked, the content service server 10 proceeds to step 607, and confirms the integrity information, and confirms whether integrity of each of the function modules included in the user device 100 for supporting the secure mode is damaged. According to the confirmation result, if it is determined that damaged integrity exists, the content service server 10 proceeds to step 613, informs the user device 100 that the authentication has failed, and ends the authentication process.

If it is confirmed that the integrity of the user device 100 is all normal, the content service server 10 proceeds to step 609 and confirms time for collecting device authentication information. The time for receiving device authentication information and collection time included in the device authentication information are compared with each other. If the difference is larger than a set standard value, it is determined that device authentication information is not available. The content service server 10 proceeds to Step 613, informs the user device 100 that the authentication has failed, and ends the authentication process.

If the difference is smaller than a set standard value, it is determined that device authentication information is available. The content service server 10 proceeds to Step 611, informs the user device 100 that the authentication has succeeded, and ends the authentication process.

According to the operation of the content service server 10 as described above, the user device 100 in step 513 of FIG. 6 may receive the authentication result. When the authentication is received, the main unit 200 transmits the authentication result to the security unit 300 in step 515. In addition, the main unit 200 proceeds to step 517, and the main unit 200 may provide the user with the authentication result.

The security unit 300 receiving the authentication result confirms the authentication result in step 519. According to the confirmation result, if the authentication is failed, the security unit 300 proceeds to step 521, and blocks the secure mode. In addition, in step 523, the security unit 300 informs the main unit 200 that the secure mode is blocked. Accordingly, in step 525, the main unit 200 provides the user with an information message indicating that the secure mode is blocked and accordingly the security service request may not be performed. According to the blockage of the secure mode, the user device 100 may normally perform the operation of downloading or executing a normal content, but may not perform the operation of downloading or executing a secure content.

If the authentication result indicates that the authentication succeeded, the security unit 300 proceeds to step 527 and normally executes the device secure mode, and accordingly access to the content service server 10 so that the request of the user is performed.

In this manner, the security level with respect to the secure content may be strengthened by confirming authentication about whether the device security level of the user device 100 is appropriate to the standard value in association with the digital content service server 10, and by blocking the operation itself of the secure mode if it is determined that the device security level of the user device 100 is not appropriate to the standard value.

According to exemplary embodiments of the present invention described above, it is assumed that when a request for access to the digital content service server 10 is present, the device authentication information is collected and transmitted to the digital content service server 10 so that an authentication process is performed. However, according to another exemplary embodiment, the device authentication information is periodically collected and transmitted to the digital content service server 10 so that an authentication process is performed. Otherwise, whenever the security service request input occurs, the device authentication information is collected and transmitted to the digital content service server 10 so that an authentication process is performed.

According to an exemplary embodiment of the present invention, a description is made of the security data processing apparatus according to the present invention with an example of a mobile apparatus, but it is easily understood by those skilled in the art to which the present invention pertains that the present invention can be applied to apparatuses that use an operating system such as a digital TV, a set-top box, a personal computer, and a laptop computer.

In addition, methods according to the exemplary embodiment of the present invention may be realized by a form of a program instruction that can be performed by various computing means and may be stored in a non-transitory computer readable medium. The non-transitory computer readable medium may include program instructions, data files, data structures, or the like singly or in combination. The program instructions stored in the medium may be designed and configured especially for the present invention or may be known and available to those skilled in the computer software field.

Exemplary embodiments of the present invention may provide a method and an apparatus for protecting digital content by strengthening the device security function of a user device consuming the digital content. In addition, exemplary embodiments of the present invention may provide a method and an apparatus for protecting a digital content with a strengthened process for authenticating the security function of the user device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for protecting digital content in an electronic apparatus, the method comprising:
    receiving, by a secure part of a processor of the electronic apparatus, a request for authenticating the electronic apparatus to execute at least one secure content, from a first part of the processor;
    transmitting, by the first part of the processor, an authentication information generated or stored by the secure part of the processor to a server which provides the at least one secure content to the electronic apparatus;
    receiving, by the first part of the processor, an authentication result for the authentication information from the server; and
    determining, by the secure part of the processor, whether to execute the at least one secure digital content based on the authentication result.

2. The method of claim 1, wherein the first part and the secure part is logically partitioned in the processor.

3. The method of claim 1, wherein the first part is operated by a main operating system and the secure part is operated by a secure operating system.

4. The method of claim 1, further comprising:
    downloading the at least one secure digital content from the server if the authentication result indicates that the electrical apparatus is authenticated by the server.

5. An electronic apparatus for protecting digital content, the electronic apparatus comprising:
    a transceiver; and
    a processor configured to comprise a first part and a secure part,
    wherein the processor is configured to:
        receive, by the secure part, a request for authenticating the electronic apparatus to execute at least one secure content, from the first part of the processor,
        transmit, by the first part, an authentication information generated or stored by the secure part of the processor to a server which provides the at least one secure content to the electronic apparatus,
        receive, by the first part, an authentication result for the authentication information from the server, and
        determine, by the secure part, whether to execute the at least one secure digital content based on the authentication result.

6. The electronic apparatus of claim 5, wherein the first part and the secure part are logically partitioned in the processor.

7. The electronic apparatus of claim 5,
    wherein the first part is operated by a main operating system, and
    wherein the secure part is operated by a secure operating system.

8. The electronic apparatus of claim 7, wherein the first part of the processor is configured to download the at least one secure digital content from the server if the authentication result indicates that the electrical apparatus is authenticated by the server.

* * * * *